United States Patent Office 2,848,361
Patented Aug. 19, 1958

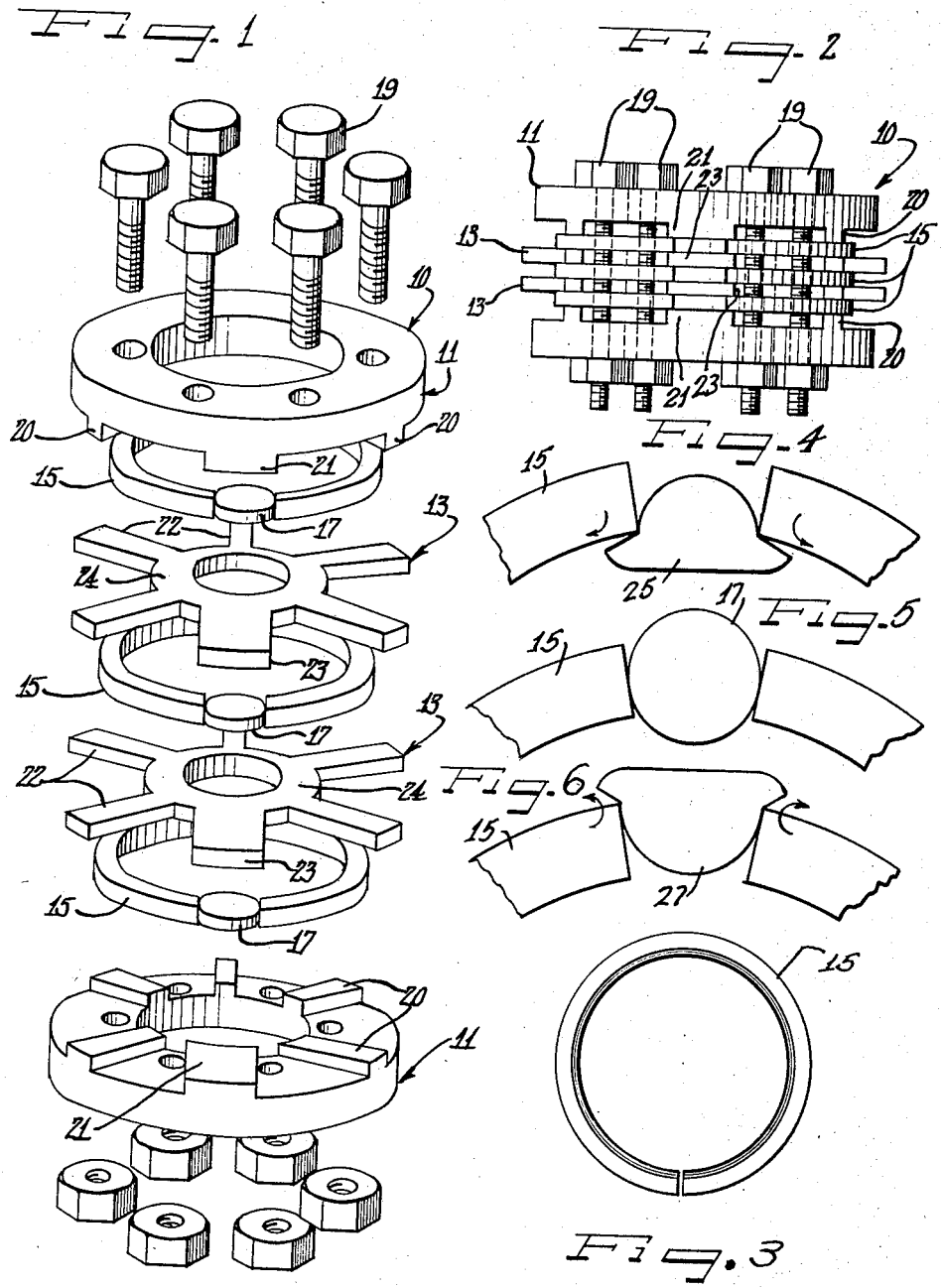

2,848,361

METHOD FOR SHAPING PISTON RINGS

Forrest W. Howell, Euclid, Ohio, assignor to Thompson Products, Inc., Cleveland, Ohio, a corporation of Ohio Application June 3, 1953, Serial No. 359,302

4 Claims. (Cl. 148—12)

This invention relates to a method and apparatus for heat shaping piston rings.

Heat shaping of piston rings has never been entirely satisfactory in that it has been necessary to use complicated and expensive generated shaping fixtures usually in the form of mandrels over which the piston rings are placed. The mandrel then must be expanded to give the desired open shape to the piston ring. In order to obtain the correct open ring shape, however, the mandrel must be made to size by experimental trial and error work, requiring an excessive amount of time and then is only suitable for use for one size of piston ring.

A principal object of my invention is to remedy the foregoing difficulties by providing a simple and inexpensive fixture and method for heat shaping piston rings in which the ring is simply spread to a desired gap and then clamped in its spread condition for heat setting and stress relieving.

A further object of my invention is to provide a novel and improved method and fixture for heat shaping piston rings, avoiding the use of the carefully developed fixtures heretofore necessary.

A further object of my invention is to provide a heat shaping fixture for piston rings which may be used to heat shape piston rings for a wide range of ring sizes.

A further object of my invention is to provide a method and apparatus for heat shaping piston rings avoiding the use of fixtures developed to the exact open shape of the ring and thus greatly facilitating the feasibility of heat shaping the piston rings and reducing the manufacturing cost thereof.

A further object of my invention is to provide a novel and improved method for heat shaping piston rings wherein the ring is spread elastically to the desired open gap and clamped in this spread condition, and then heated to a temperature above the upper critical temperature of the metal, and then cooled while so clamped.

Still another object of my invention is to provide a simple and improved method and apparatus for heat shaping piston rings, wherein the rings are spread by the use of gapping slugs, to produce an ideal open shape to the ring, and are maintained in this spread condition by a clamping fixture and heated to a stress relieving temperature and then cooled while spread.

Still another object of my invention is to provide a fixture for heat shaping piston rings in which a plurality of rings are clamped between opposing clamping plates and spiders, and are spread to the desired open gaps by gapping slugs and maintained in this spread condition by the clamping plates engaging the sides of the ring, and in which the ring is maintained flat in this spread condition by the clamping plates and spiders.

These and other objects of my invention will appear from time to time as the following specification proceeds and with reference to the accompanying drawing wherein:

Figure 1 is an exploded view of a heat shaping fixture constructed in accordance with my invention;

Figure 2 is a view of the fixture in a clamped position showing the rings clamped therein;

Figure 3 is a plan view of a piston ring, such as may be heat shaped by the process and apparatus of my invention;

Figure 4 is a diagrammatic view showing a gapping slug in position to gap and stress the ring to negative circularity;

Figure 5 diagrammatically shows the ring gapped to neutral circularity; and

Figure 6 diagrammatically shows the ring gapped to positive circularity.

In the embodiment of my invention illustrated in the drawing I have shown a heat shaping fixture 10, having top and bottom clamping plates 11, and intermediate spacing spiders 13, 13, spacing a plurality of piston rings 15 apart, and maintaining the piston rings spread to the desired open gap. Gapping slugs 17, 17 are shown as being inserted in the gaps in the rings to give the desired open gap thereto. Fastening devices extending through the clamping plates 11, 11 and herein shown as being nuts and bolts 19, 19 are provided to clamp the rings between said clamping plates and spiders, and to clamp the rings flat while spread to the correct open gap.

The clamping plates 11, 11 are shown as being of an annular formation and as having a plurality of spaced radial ribs 20, 20 engaging one face of the ring and providing for the circulation of air therearound. As herein shown, each clamping plate 11 has a central radial rib 21, shown as being wider than the ribs 20, 20 upon which the gap of the ring may be located during heat shaping of the ring as shown in Figure 2.

The spacing spiders 13, 13 are also shown as having a plurality of radial ribs 22 and 23 extending from a central annular hub 24. It should here be understood that the number of spiders used depends upon the number of rings which are heat shaped and that where one ring only is heat shaped, that the spiders 13, 13 may be dispensed with and the two spaced clamping plates 11, 11 may clamp the ring in the correctly gapped position.

In setting up the fixture and clamping the rings therebetween, a piston ring 15 may be set on the bottom clamping plate 11 and a slug 17 may be inserted in the gap between adjacent ends of the ring, to elastically spread the ring to the desired open gap, giving the ring the correct open shape. A spacing spider 13 may then be placed on the top of the ring where more than one ring is to be heat shaped in the same fixture, or if only one ring is to be heat shaped the upper clamping plate 11 may engage the top surface of the ring and the two clamping plates may be clamped together by the nuts and bolts 19, 19.

Where more than one ring is to be heat shaped it is obvious that one spacing spider is placed on the top of the one gapped ring and the next adjacent ring is spaced on the top of this spacing spider and gapped. This operation may be repeated until the desired number of rings are placed in the fixture, the top clamping plate 11 engaging the top ring in the fixture. The rings are then rigidly clamped to the fixture in a flat condition with the desired open gap and are maintained in this clamped condition during the heat shaping operations. The gapping slugs may be removed before the heat treatment after the rings are clamped or they may remain in position between the ends of the rings if desired.

It should here be understood that the heat shaping fixture is clamped to the ring during the entire heating and cooling operation for shaping the ring, and that the rings are heated to the upper limit of the stress relieving temperature of the metal from which the rings are made, so the heat shaping fixture as well as the spacing spiders, gapping slugs (if the slugs are not removed prior to heat treatment) and fastening bolts must be of a material which will maintain their strength and rigidity at far higher temperatures than the upper limit of stress relieving temperatures of the rings.

One alloy which has been found to be extremely suitable for this purpose is a "Timken Alloy" 16–25–6 whose properties, such as strength and rigidity, are good up to temperatures of approximately 2000° F. It should be understood however, that other materials may be used, as long as the fixture will maintain its strength and rigidity at heat shaping temperatures.

When the piston rings have been spread elastically to the desired open gap by the gapping slugs 17, 17 and clamped in this position by the clamping fixture 10, the fixture and rings may then be heated to a stress relieving temperature, which is maintained for a sufficient time interval to cause the carbon to go into solution. The fixture and rings may then be cooled either in air or by quenching, dependent upon the properties of the piston ring material, and the desired properties of the finished ring. If required, the rings may then be hardened at a desired aging temperature.

The rings may then be removed from the fixture and when so removed will be flat and to the correct open shape.

In Figures 4, 5 and 6, I have shown the rings gapped and stressed to negative neutral and positive circularity to stress the ring to engage the cylinder wall with the desired pressure, and to reduce tilting of the ring in the ring groove of the piston.

Figure 4 shows a gapping slug 25 gapping the ring from the inside thereof and stressing the ring in the direction of the arrows and imparting negative circularity stresses thereto.

Figure 5 shows the gapping slug 17 gapping the slug to neutral circularity as in Figure 1.

In Figure 6, a gapping slug 27 is shown as gapping the ring from the outside thereof and stressing the ring to positive circularity in the direction of the arrows thereon.

It should be understood that when gapping the ring to positive and negative circularity that the gap between adjacent ends of the ring may be the same as when stressed to neutral circularity. The gapping slug 25 may therefore be of a smaller diameter than the gapping slug 27.

The method of my invention has been found to be especially suited to metals in which the desired microstructure can be obtained during the cooling cycle from a complete stress relieving temperature. One of such metals is 52100 steel. With such steels the temperature employed for stress relieving was approximately 1550° F. The fixture and ring were then air cooled.

The foregoing heat treatment was resorted to to obtain complete stress relieving and a pearlitic micro-structure, it being understood that the stress relieving temperature is the temperature at which the carbon goes into solution and is above the upper critical temperature of the metal. The time the rings were submitted to this temperature of 1550° F., was a period of approximately 5 minutes.

Other piston rings made from 52100 steel have been gapped and clamped into position and subjected to temperatures of 1550° F., and then water quenched and drawn at 800° F., to obtain a tempered Martensitic structure.

Rings made from S. A. E. 1095 steel have also been heat shaped in accordance with the above process and have been heated to a temperature of 1550° F., and air cooled, and also have been water quenched and drawn at 800° F., with extremely satisfactory results.

Where the piston rings are made from irons, such as nodular or gray cast iron, the rings have been gapped and clamped in the heat shaping fixture and heated to stress relieving temperatures at 1600 and 1650° F., and have been maintained at these temperatures long enough for the carbon to go into solution and have been air cooled to give a pearlitic microstructure.

The process of my invention has also been applied to straight carbon steels and the various irons which may undergo phase changes during heat treatment and to the precipitation hardening alloys. In heat shaping piston rings made from the precipitation hardening alloys, the heat treatment and stress relieving consists in heating the rings to a temperature high enough to permit a solid solution of carbon to form, and then quenching the rings clamped to their fixture, and hardening the rings at the desired aging temperature while so clamped.

It may be seen from the foregoing that an extremely simple apparatus and process has been provided for economically heat shaping piston rings, to impart the correct open shape to the ring for the desired wall pressure, when in the installed state, and to stress relieve the piston ring in its normal free shape, and that this process consists simply in spreading the ring elastically to the desired open gap by gapping slugs and clamping the rings flat in this spread state, and then heating the clamped rings to stress relieving temperatures above the critical temperature of the metal of the ring, and maintaining the ring at this temperature until the carbon goes into solution, and then cooling the ring in air or quenching the ring and hardening to the desired aging temperature.

It may further be seen that the process of my invention is particularly suited to metals in which the desired microstructure can be obtained during the cooling cycle from a complete stress relieving temperature, and that the process is applicable to many forms of steel in common use today for making piston rings, as well as to cast irons of various forms.

It may further be seen that the apparatus and process of my invention has completely eliminated the necessity of generating shaping fixtures and experimenting with the fixtures to obtain the required form for heat shaping, and that the same fixtures may be used for a wide range of ring sizes, and is particularly adapted to quantity production.

It will be understood that various modifications and variations of the present invention may be effected without departing from the spirit and scope of the novel concepts thereof.

I claim as my invention:

1. The method of stress relieving and heat shaping split annular piston rings which comprises the steps of elastically spreading the ring while free to the desired open gap by engaging the adjacent ends of the ring and moving the adjacent ends of the ring apart and spacing the ring to the required gap, clamping the ring flat and retaining the ring in its gapped position by engaging the ring only at circumferentially spaced regions, heating the spread ring while so clamped to a temperature sufficient to cause the carbon to go into solution and maintaining the ring at this temperature, and then cooling the ring in air, to relieve the stresses thereon.

2. The method of stress relieving and heat shaping split annular piston rings which comprises the steps of elastically spreading the ring to the desired open gap by engaging the adjacent ends of the ring and moving the adjacent ends of the ring apart and inserting a gapping slug between the adjacent ends of the ring to maintain the ring so spread, then engaging opposite faces of the ring with the radially spaced ribs of an open clamping fixture and clamping the ring flat to the required gap while so spread, heating the gapped ring so clamped to a temperature sufficient to cause the carbon to go into solution, then cooling the clamped ring in air to relieve the stresses thereon.

3. The method of shaping split annular cast iron piston rings which comprises the steps of elastically spreading the rings to the desired open gaps by engaging the adjacent ends of the free rings and moving the adjacent ends of the rings apart and spacing the adjacent ends of the rings to the required gap, separating the spread rings from each other by engaging the rings only at circumferentially spaced regions, clamping the separated rings by engaging the outer faces of the outer rings only at circumferentially spaced regions and drawing the rings so separated in flat spread conditions, heating the rings so clamped to a stress relieving temperature above the critical temperatures of the rings for a period long enough for the carbon to go into solution, and then cooling the rings in air while so clamped.

4. The method of stress relieving and heat shaping split annular piston rings which comprises elastically spreading the rings while free to the desired open gaps and inserting gaping plugs between adjacent ends of the rings for retaining the rings in their spread conditions to the required gap, spacing the spread rings apart by inserting the rings between spacing spiders engaging the outer faces of the rings at circumferentially spaced regions only, clamping the spaced rings flat in their gapped conditions by engaging the outer faces of the outer rings at circumferentially spaced regions and drawing the rings together into engagement with the adjacent spacing spiders, heating the rings so clamped to a stress relieving temperature above the critical temperature of the rings for a period long enough for the carbon to go into the solution, and then cooling the rings in air while so clamped.

References Cited in the file of this patent

UNITED STATES PATENTS

| | | |
|---|---|---|
| 256,898 | Jacobs | Apr. 25, 1882 |
| 606,675 | Marcy | July 5, 1898 |
| 1,218,420 | Landers | Mar. 6, 1917 |
| 2,027,116 | Oubridge | Jan. 7, 1936 |
| 2,183,358 | Six | Dec. 12, 1939 |
| 2,271,111 | Wulff | Jan. 27, 1942 |
| 2,417,610 | Phillips | Mar. 18, 1947 |
| 2,717,846 | Harvey | Sept. 13, 1955 |